J. R. SENSIBAR.
METHOD OF AND APPARATUS FOR COLLECTING AND DELIVERING SAND.
APPLICATION FILED MAY 6, 1918.
1,337,279.  Patented Apr. 20, 1920.
3 SHEETS—SHEET 1.
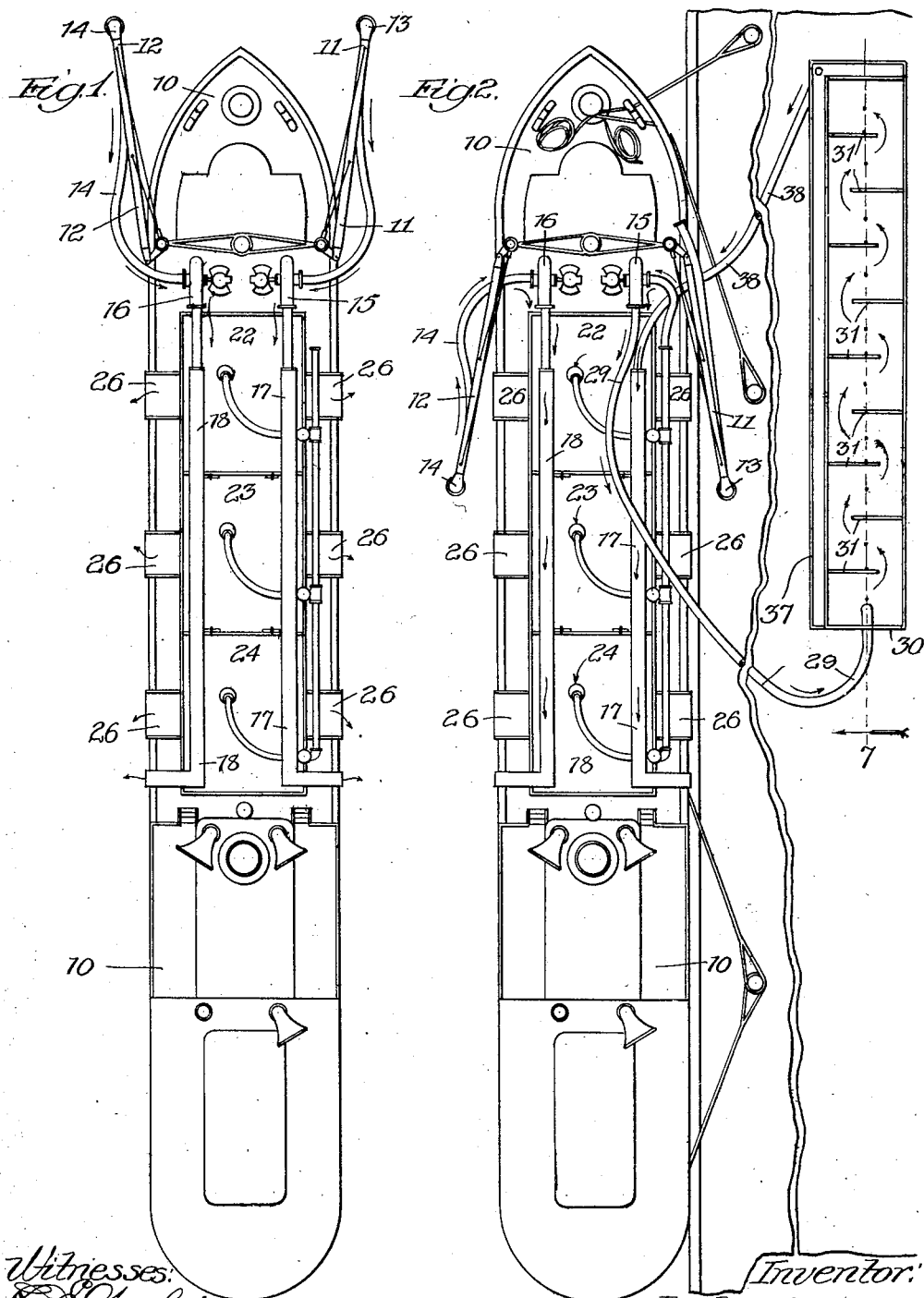

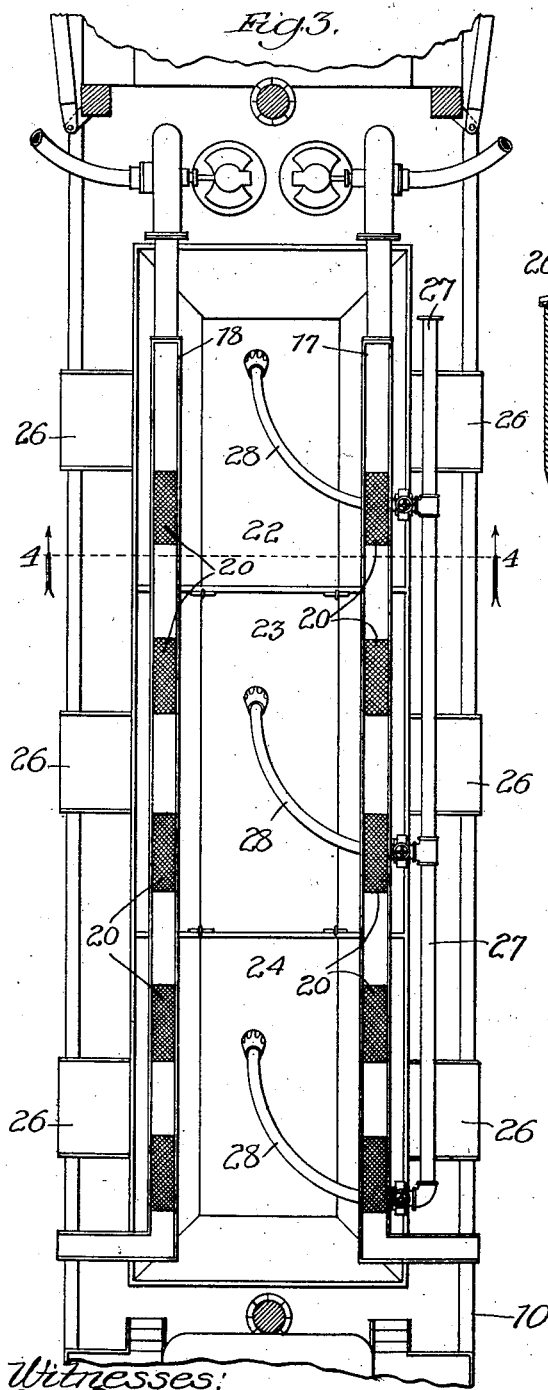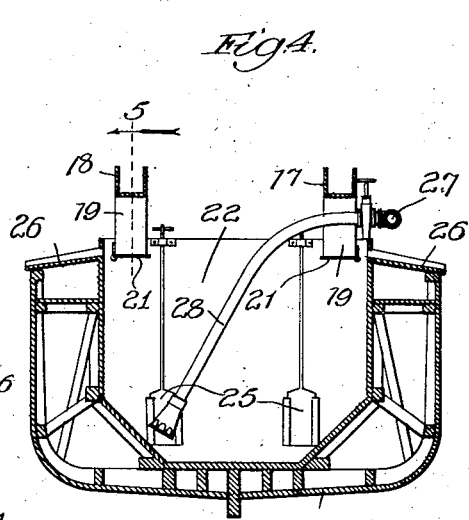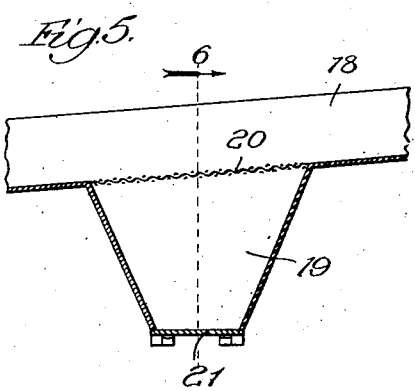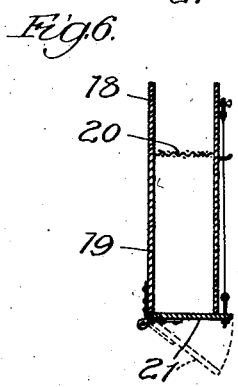

J. R. SENSIBAR.
METHOD OF AND APPARATUS FOR COLLECTING AND DELIVERING SAND.
APPLICATION FILED MAY 6, 1918.
1,337,279.
Patented Apr. 20, 1920.
3 SHEETS—SHEET 3.
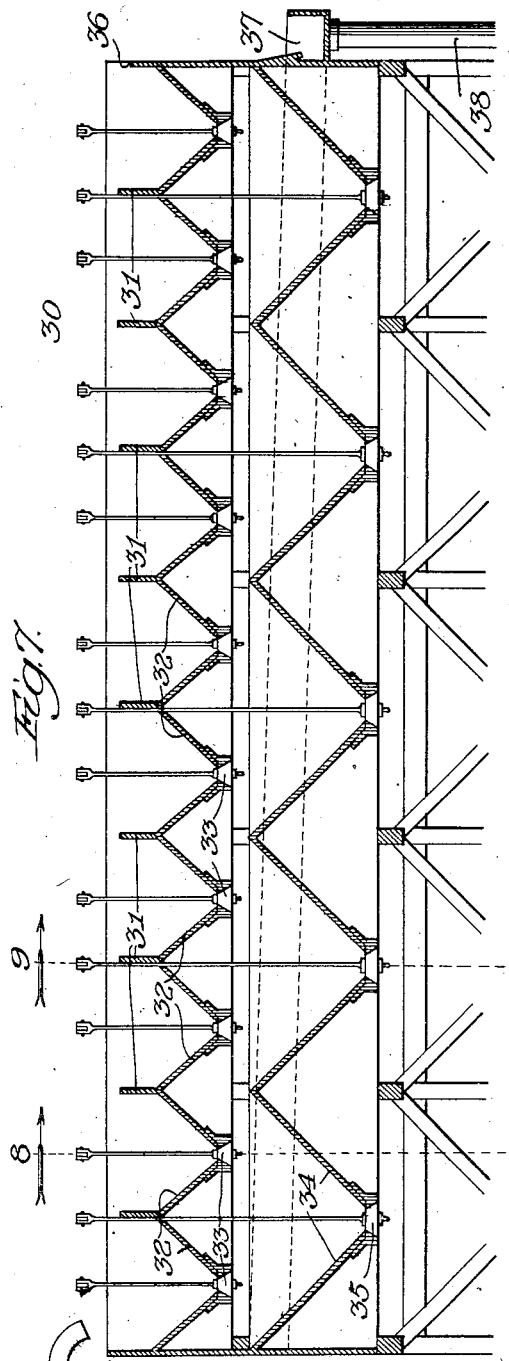
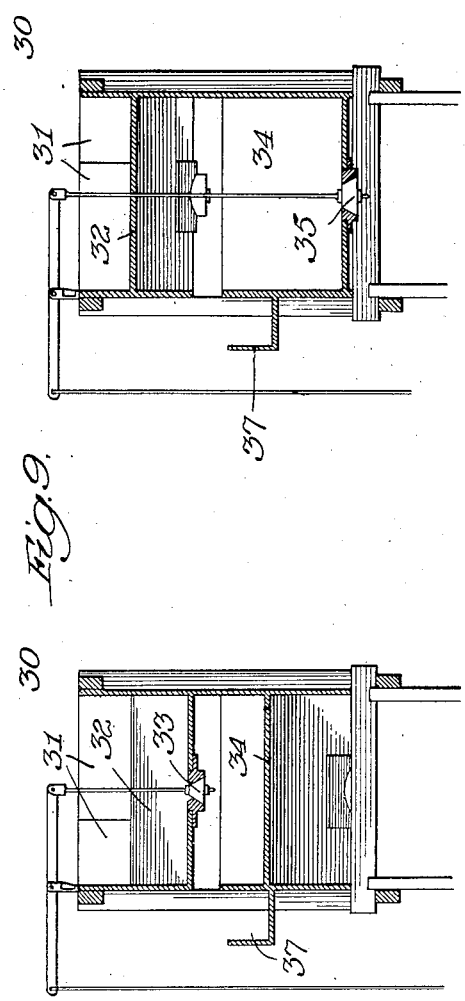
Witnesses:
Inventor:
Jacob R. Sensibar,

UNITED STATES PATENT OFFICE.

JACOB R. SENSIBAR, OF GARY, INDIANA.

METHOD OF AND APPARATUS FOR COLLECTING AND DELIVERING SAND.

1,337,279.	Specification of Letters Patent.	Patented Apr. 20, 1920.

Application filed May 6, 1918. Serial No. 232,720.

*To all whom it may concern:*

Be it known that I, JACOB R. SENSIBAR, a citizen of the United States, residing at Gary, in the county of Lake and State of Indiana, have invented a new and useful Improvement in Methods of and Apparatus for Collecting and Delivering Sand, of which the following is a specification.

This invention consists in a method of and apparatus for collecting and delivering sand, the preferred apparatus for the practice of the method being illustrated in the accompanying drawings in which Figure 1 is a plan view illustrating the operation of gathering sand into the vessel; Fig. 2 is a similar view showing the arrangement when the vessel is being discharged of its contents; Fig. 3 is a detailed view of the sand hoppers and the adjacent parts of the vessel; Fig. 4 is a section on the line 4 of Fig. 3; Fig. 5 is a section on the line 5 of Fig. 4; Fig. 6 is a section on the line 6 of Fig. 5; Fig. 7 is a section on the line 7 of Fig. 2 through the sand separating apparatus, and Figs. 8 and 9 are transverse sections on the lines 8 and 9, respectively, of Fig. 7.

In the practice of my method, there is provided a sand collecting and transporting vessel 10 at the front of which are booms 11 and 12 carrying suction pipes 13 and 14, which are connected to rotary pumps 15 and 16. The booms can be swung to any desired angular position and the suction pipes may be lowered to the lake or sea bottom so as to draw up the sand in a manner which is common in connection with suction dredges. The pumps discharge into troughs 17 and 18, each of which has along its bottom, hopper-shaped outlets 19 covered by screens 20 and closed at the bottom by doors 21, any or all of which can be opened. The vessel here illustrated is provided with three sand receptacles 22, 23, and 24, into which the hoppers 19 discharge. The partitions between the receptacles have openings controlled by vertically, slidable, plates 25, by which the receptacles may be thrown into communication. The receptacles are likewise provided with lateral spill-ways 26 through which the surplus water will drain off into the lake or sea.

The apparatus so far described is sufficient for collecting sand and loading the vessel. In operation, the vessel moves to the desired position, the suction pipes are lowered, the rotary pumps set in operation, and the dredging proceeds as in accordance with common suction dredge practice. The water discharged from the pumps (together with the solids carried by it), enters the troughs 17 and 18 and is thereby distributed to the several receptacles which are, in reality, settling chambers or tanks in which the sand settles to the bottom and the water overflows through the lateral spill-ways. If it is found that one receptacle is filled too rapidly, or if there is an undue deposit of sand on one side, such as might list the boat, the discharge of sand into the receptacles can be regulated by opening or closing the doors 21, so as to produce the proper distribution of the cargo.

When the several receptacles are filled with sand to the desired point, the suction pipes are raised and the vessel proceeds to the point where the sand is to be discharged. At such time it will be understood that the receptacles are practically full of sand containing a relatively small quantity of water, the sand being quite compact and firm, and the surplus water having been quite thoroughly drained off. The vessel is in the first instance tied up along shore adjacent to the separating apparatus hereinafter to be described, and the discharge of the vessel's contents can then be commenced.

In the first instance, one of the suction pipes, as the pipe 14, is lowered into the water, its pump is operated and water is discharged into the trough 18. The other suction pipe is disconnected from the suction pump, which is connected to a longitudinal pipe 27 running along one side of the vessel. This pipe is connected with a series of flexible suction pipes 28, one in each of the sand receptacles in the vessel, valves being provided by which any of the suction pipes 28, or all of them together, can be operated at will. The discharge side of the pump 15 in this discharging operation is connected to a sand discharge pipe 29. Thus in this sand discharging operation, an excess of water is emptied into the receptacles and the sand is removed therefrom by a suction dredge operation, being passed out through the pipe 29.

As shown in the drawing the suction pipes 28 are of flexible material, as rubber, such as are usually employed with suction dredges, and hence they are never buried to the lowest level of the sand and water mixture but having their suction heads just below the level of the same. As will be seen from Fig. 4 of the drawing, in which the compartment 22 is illustrated as having been emptied, the pipes 28 are of a length sufficient to follow down the lowering level of the mixture of sand and water and to sweep the compartments.

The mixed sand and water enters the upper end of the sand separating apparatus best illustrated in Figs. 2, 7, and 9. It comprises an elongated trough 30 having partitions 31 extending partially across it alternately from opposite directions, so that the fluid is compelled to take a tortuous course. The bottom of the upper part of the trough is provided with a series of hopper-like depressions 32, each of which is closed by a valve 33. The sand collects in these depressions and any one may be emptied at will by depressing the valve, whereupon the sand, and some water with it, will be discharged into a lower hopper 34 where it will be permitted to drain and settle before being finally discharged through a valve 35 practically dry enough for use.

The surplus water with the sand, is discharged at the end of the upper trough over the end wall at 36, whereas the surplus water from the lower hoppers is spilled laterally, all the water collecting in a trough 37 from whence it is returned by a pipe 38 to the trough 17 on the vessel, and thence to the sand receptacles.

It will be understood that with the best possible separation of sand and water, the surplus water will still carry a considerable quantity of solids in suspension and this water cannot be allowed to continuously run out on the ground for it would eventually find its way back into the harbor and produce such an accumulation of sand as would seriously interfere with the continued operation of the system, and might be a positive hindrance to navigation. Furthermore, if the surplus water were permitted to run away, the process would be wasteful of sand, whereas by my system the surplus water from the separating apparatus, carrying whatever solids are not adequately separated, reënters the sand receptacles and serves as a medium for carrying along further quantities of sand. In actual practice, there is, of course, some water which escapes from the sand hoppers 34 when the valves 35 are opened and thus a small quantity of fresh water has to be added by the pump 16 throughout the operation, but after the discharge of the vessel has got well under way, the same water is, in the main, used repeatedly and the waste of sand is thus reduced to a minimum and it is quite possible to prevent the escape of any considerable body of sand into the harbor.

In the emptying of the vessel, it is desirable to open the doors in the partitions between the sand receptacles so that the water can course from one receptacle to another, and by its circulation break up the sand body and permit its more complete removal.

I realize that considerable variation is possible in the details of the method herein described, as well as in the structure of the preferred apparatus, and while I have described the same in detail to enable those skilled in the art to practise the invention, it is not my intention to limit myself to such preferred form except as pointed out in the accompanying claims in which it is my intention to set forth the novelty, both of process and apparatus, as broadly as is permitted by the state of the art.

What I claim as new and desire to secure by Letters Patent is—

1. The herein described improvement in apparatus for discharging a vessel of a cargo of sand, which consists of a settling trough having a series of quiescent sand receiving receptacles, means for discharging the sand collected therein, together with some water from the bottoms of said receptacles into the other settling receptacles beneath, said other receptacles being provided with openings in their bottoms through which the drained sand may be discharged, means for pumping mixed sand and water from the vessel to said separating trough, and means for returning the water partially freed from sand from the separating receptacle to the vessel.

2. The herein described sand separating device comprising a trough having a series of transverse baffle plates to produce quiescent spaces in the trough, hopper-shaped depressions in the bottom of the trough, sand discharging doors in said hopper-shaped depressions draining hoppers beneath said sand discharging doors, and means for discharging the sand from said draining hoppers.

3. The herein described sand separating device comprising a trough having a series of transverse baffle plates to produce quiescent spaces in the trough, hopper-shaped depressions in the bottom of the trough, sand discharging doors in said hopper-shaped depressions, draining hoppers beneath said sand discharging doors, means for discharging the sand from said draining hoppers, and means for collecting the water which passes through the trough and that drained from the draining hoppers.

In testimony whereof I have hereunto set my hand and seal.

JACOB R. SENSIBAR. [L. S.]